(12) United States Patent
Majumder

(10) Patent No.: US 8,872,799 B2
(45) Date of Patent: Oct. 28, 2014

(54) SCALABLE DISTRIBUTED/ COOPERATIVE/COLLABORATIVE PARADIGM FOR MULTI-USER INTERACTION WITH PROJECTION-BASED DISPLAY WALLS

(75) Inventor: Aditi Majumder, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 316 days.

(21) Appl. No.: 13/276,450

(22) Filed: Oct. 19, 2011

(65) Prior Publication Data

US 2012/0319997 A1      Dec. 20, 2012

Related U.S. Application Data

(60) Provisional application No. 61/499,055, filed on Jun. 20, 2011.

(51) Int. Cl.
*G06F 3/042* (2006.01)
*G06F 3/01* (2006.01)
*H04N 9/31* (2006.01)

(52) U.S. Cl.
CPC .............. *G06F 3/017* (2013.01); *H04N 9/3147* (2013.01)
USPC ........................................................ 345/175

(58) Field of Classification Search
CPC combination set(s) only.
See application file for complete search history.

(56) References Cited

U.S. PATENT DOCUMENTS

| | | | |
|---|---|---|---|
| 6,932,481 B2* | 8/2005 | Koyama et al. | 353/94 |
| 7,252,387 B2* | 8/2007 | Raskar et al. | 353/69 |
| 2011/0055729 A1 | 3/2011 | Mason et al. | |
| 2011/0080361 A1 | 4/2011 | Miller et al. | |
| 2011/0196864 A1* | 8/2011 | Mason et al. | 707/728 |
| 2011/0249019 A1 | 10/2011 | Chen | |
| 2012/0076353 A1* | 3/2012 | Large | 382/103 |
| 2012/0086630 A1* | 4/2012 | Zhu et al. | 345/156 |
| 2012/0242910 A1 | 9/2012 | Ivashin | |

FOREIGN PATENT DOCUMENTS

| | | | |
|---|---|---|---|
| JP | 2006-276124 A | 10/2006 | |
| JP | 2009-003323 A | 1/2009 | |

OTHER PUBLICATIONS

International Search Report, Korean Intellectual Property Office, dated Apr. 25, 2013.
R. Yang, A. Majumder, and M. Brown. Camera based calibration techniques for seamless multi-projector displays. IEEE TVCG, 2005.

* cited by examiner

*Primary Examiner* — Van Chow
(74) *Attorney, Agent, or Firm* — Shimokaji & Associates, P.C.

(57) ABSTRACT

A method of distributed/cooperative/collaborative gesture management may comprise queuing actions of gestures as the gestures move across a display, processing the actions of each of the gestures by a projector in which the projector's display is close to a gesture, sending an anticipatory action message that one of the gestures is predicted to enter a display region of a projector, processing the actions of one of the gestures by a projector in which the projector's display is close to the one of the gestures, and in response to the one of the gestures being in an overlapping display projected by overlapping projectors, the actions of the one of the gestures are processed by the overlapping projector with the smallest identifier.

5 Claims, 10 Drawing Sheets

SCALABLE DISTRIBUTED/COOPERATIVE/COLLABORATIVE PARADIGM FOR MULTI-USER INTERACTION WITH PROJECTION-BASED DISPLAY WALLS

CROSS-REFERENCE TO RELATED APPLICATIONS

This application claims the benefit of Provisional Application 61/499,055 filed Jun. 20, 2011.

STATEMENT OF GOVERNMENT INTEREST

The invention described herein was made in the performance of official duties by one or more employees of the University of California University system, under National Science Foundation contract NSF IIS-0846144, and the invention herein may be manufactured, practiced, used, and/or licensed by or for the government of the State of California without the payment of any royalties thereon or therefor.

BACKGROUND

The present invention relates to a tiled projection-based display and more specifically, to multi-user interaction with tiled projection-based display walls.

Few recent works address systems with multiple projectors and cameras. A few systems process images from a camera by a computer connected to each camera, but the systems utilize a centralized server that controls the system.

Accordingly there is a need for a scalable paradigm with a distributed/cooperative/collaborative system for multi-user interaction with tiled projection-based display walls.

SUMMARY

According to one aspect of the present invention, a method of distributed/cooperative/collaborative gesture management, comprises listing actions of a gesture as the gesture moves across a display; and processing the actions of the gesture by a subset of a plurality of projectors in which the subset of the plurality of projectors' display has a defined priority to claim the gesture via proximity, and each of the plurality of projectors operates independently of the others of the plurality of projectors.

According to another aspect of the invention, a method of distributed/cooperative/collaborative reaction management comprises removing an action from a queue of actions operating independently of the other projectors; creating an event corresponding to the removed action; and processing the created event and communicating with other projectors that respond to the event to create an event across the entire display by: computing event attributes and associating the event with the gesture; determining if the created event and the events from the other projectors refer to the same gesture; sending event messages to those of the plurality of projectors affected by the processed created event and processed received events; and executing the created event and executing the received events by performing a function associated with the created event and the received event.

According to another aspect of the invention, a method of video synchronization comprises capturing an image by a plurality of projectors; comparing the captured images by the plurality of projectors with each other; identifying a most lagging projector; calculating a frame delay for each of the projectors based on the most lagging projector; and synchronizing the plurality of projectors by incorporating the calculated frame delay for each of the projectors.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The current invention may provide a distributed/cooperative/collaborative/cooperative gesture management system that interacts with multiple devices each including at least a projector, camera, and a computing and communicating device, such that devices operate independently of each other without a central controller. The current invention may also include reaction management to gestures, and video frame synchronization for a federation of projectors using camera feedback.

Current systems of gesture management generally do not use distributed/cooperative/collaborative devices. In addition, current procedures use message feedback rather than video time-lagging feedback for synchronization.

Figure 1:
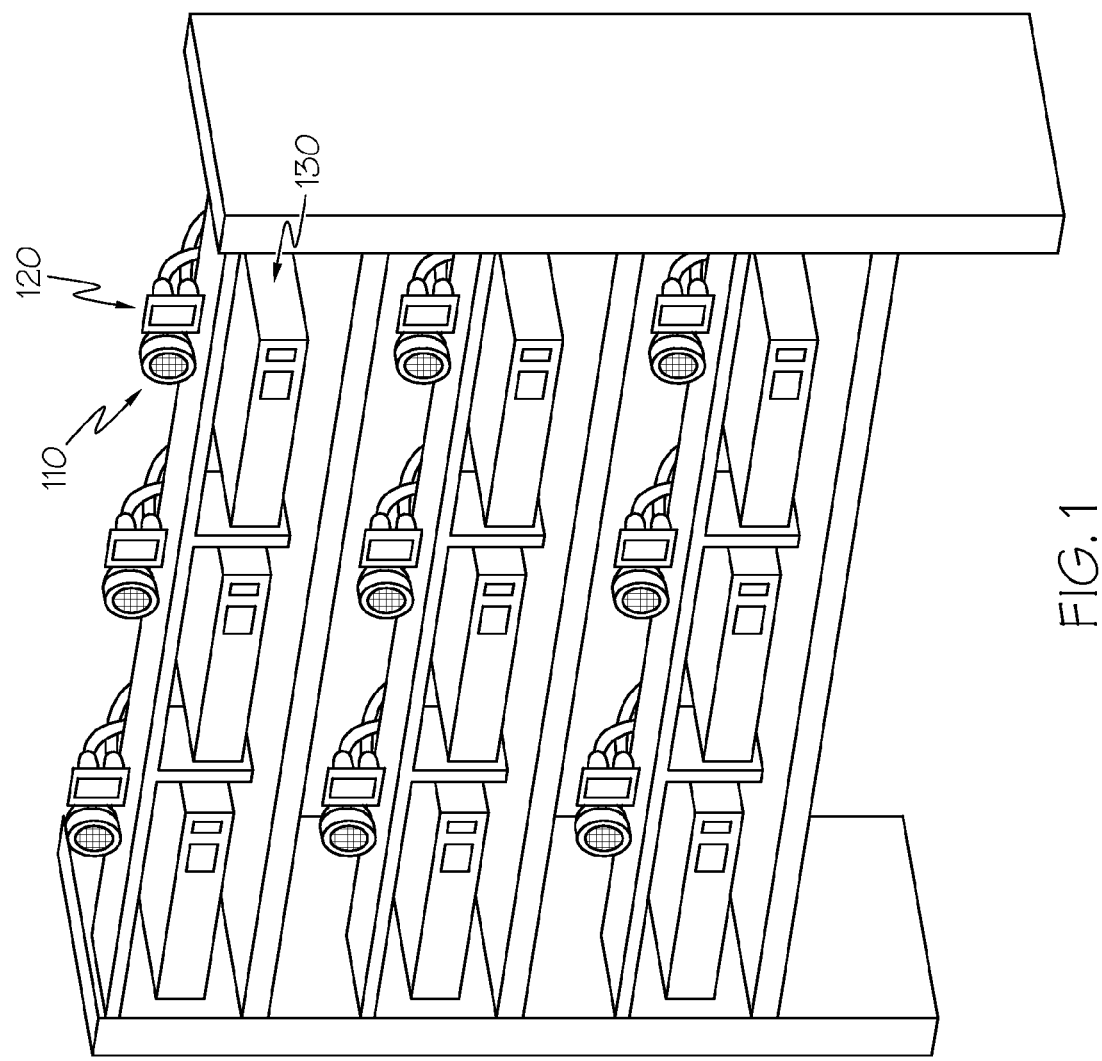
FIG. 1 shows a perspective view of a three by three array of projectors for displaying images referred to in an exemplary embodiment of the invention.
Figure 2:
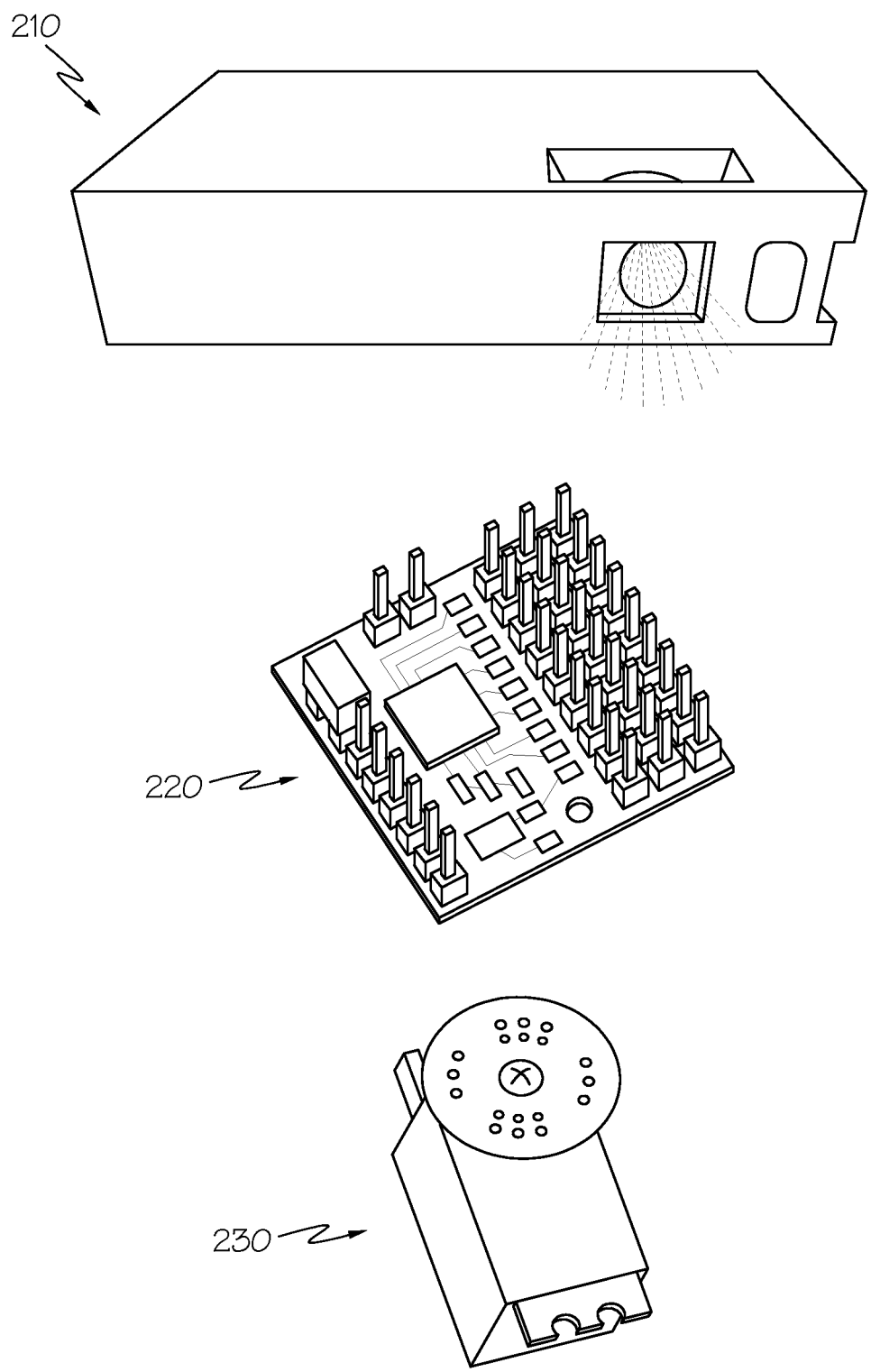
FIG. 2 shows a perspective view of a projector, servo, and servo controller for displaying images according to an exemplary embodiment of the invention.
Figure 3:
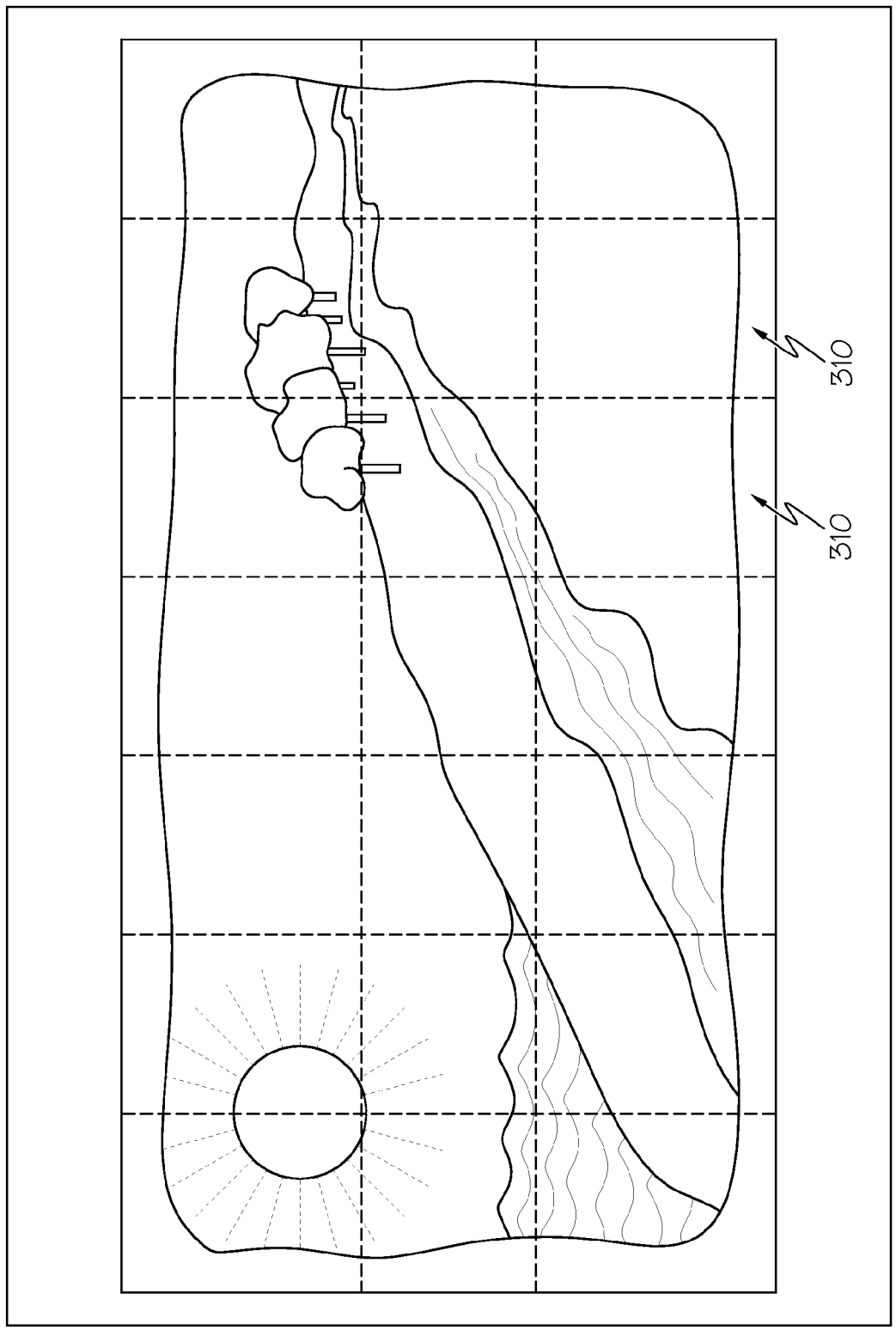
FIG. 3 shows a front view of display of tiled images according to an exemplary embodiment of the invention.
Figure 4:
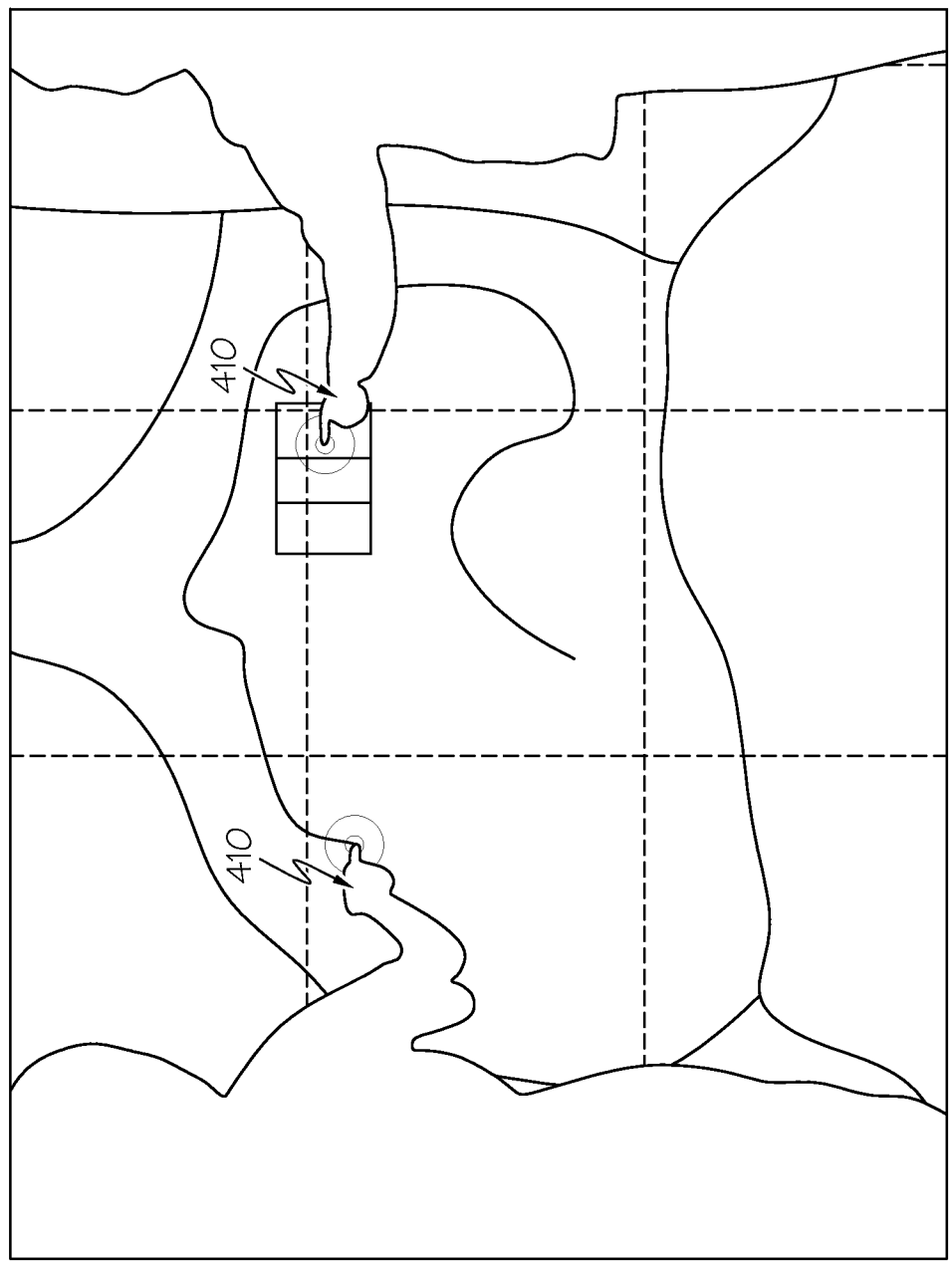
FIG. 4 shows a front view of gestures according to an exemplary embodiment of the invention.

Referring to FIG. 1, in an exemplary embodiment, projectors are shown in a three by three array. Each of the projector systems may include an illuminator 110, camera 120, projector 130 and computer (not shown). FIG. 2 shows a projector 210 with a servo 230 used to switch infra-red filters, and a servo controller 220. FIG. 3 shows a display of multiple projectors, such that the projections were deliberately not blended so that the projections 310 of the different projectors can be differentiated. FIG. 4 shows persons performing gestures 410 that are projected onto a wall.

Figure 5:
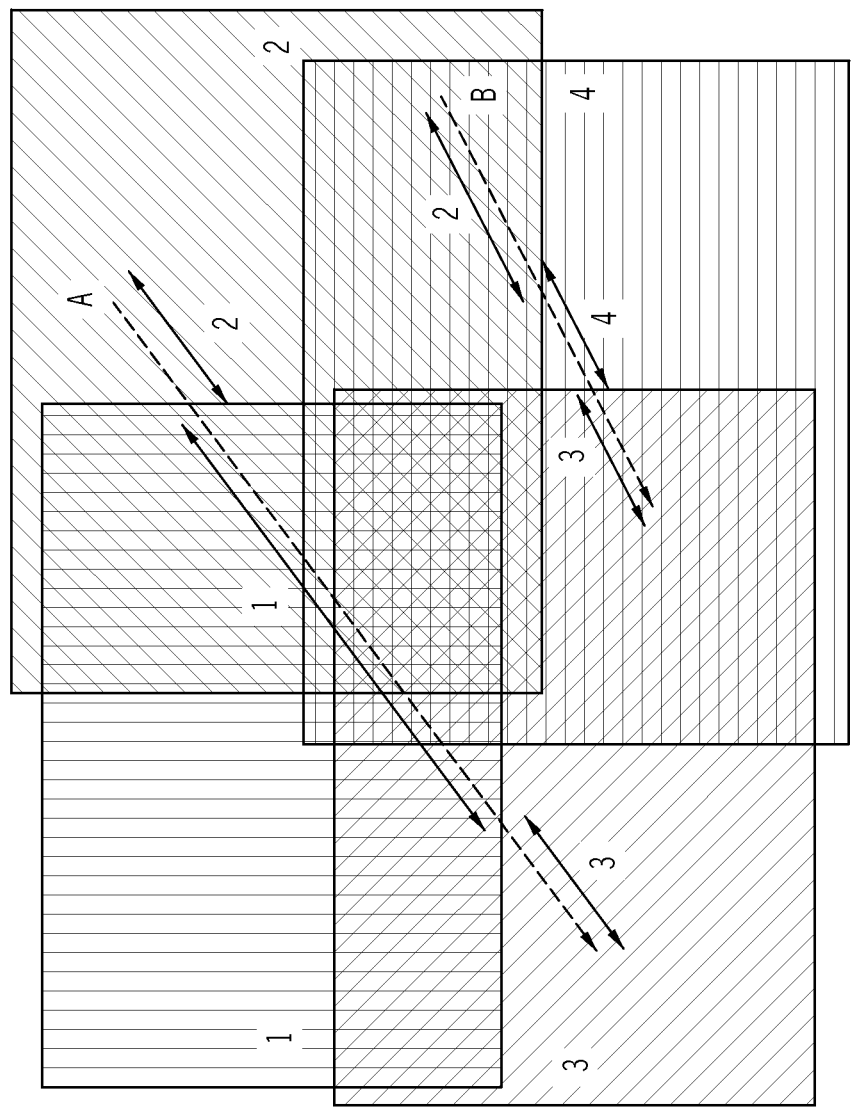
FIG. 5 shows a charted view of how gestures are handled according to an exemplary embodiment of the invention.

Referring to FIG. 5, an exemplary embodiment shows gestures made across multiple projectors. A and B denote two different gestures. The area of the gesture may be divided and labeled to show which projectors handle which part of the gesture. There may be a listing of actions of a gesture as the gesture moves across a display. The actions of the gesture may be processed by a subset of the projectors in which the subset of projectors has a defined priority to claim the gesture via proximity, and each of the projectors operates independently of the other projectors.

Figure 6:
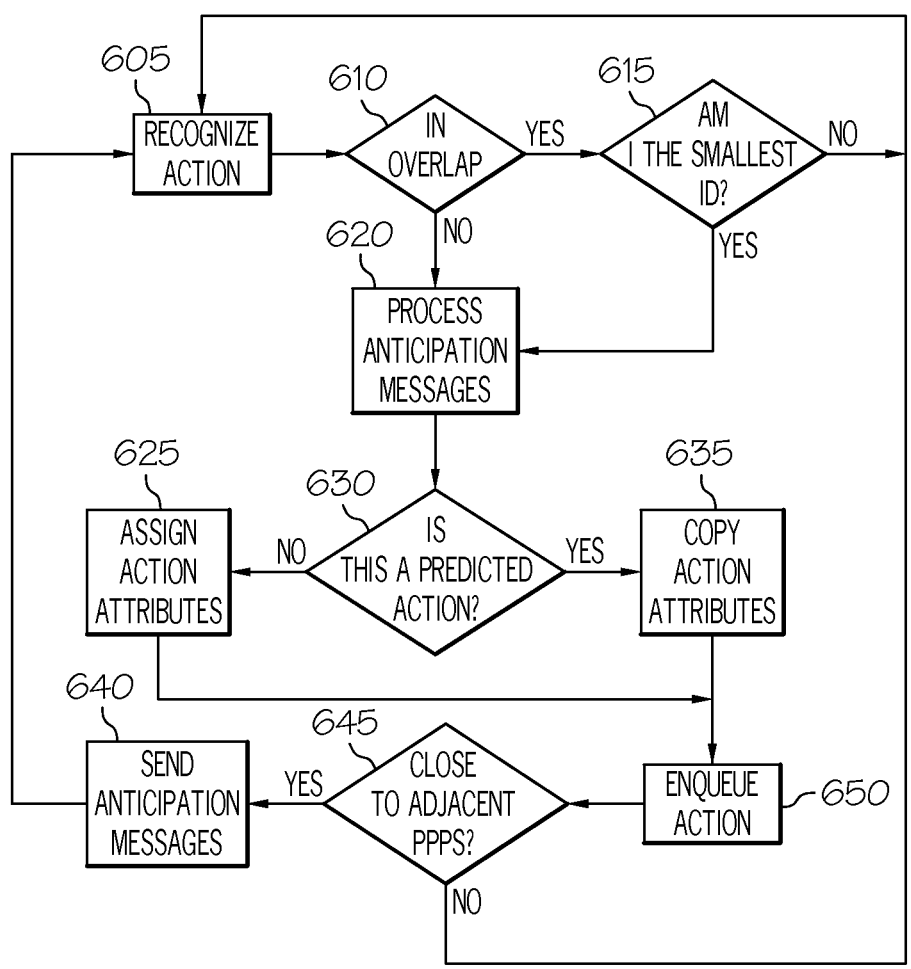
FIG. 6 shows distributed/cooperative/collaborative gesture management according to an exemplary embodiment of the invention.

Referring to FIG. 6, in an exemplary embodiment of the invention, a flowchart may show a distributed/cooperative/collaborative gesture management protocol. A gesture action may be recognized 605 as it moves across a display of a projector. A gesture may be assigned a position value, a projector identifier, a gesture identifier, a gesture type, a gesture speed, a gesture acceleration, and a timestamp. A gesture may be, for example a gesture from a human hand or a laser. It may be determined whether there is overlap 610 between two devices. If there is overlap, it may be determined which of the overlapping projectors has a smallest identifier 615. The overlapping projector with the smallest identifier may then handle the management of the gesture. If the projector handling the gesture anticipates that the gesture will enter an area of another projector, the projector handling the gesture may send an anticipation message 620 to the projector that is to receive the gesture. If multiple anticipatory messages are received from a single gesture, a projector may respond to only the most recent anticipatory message. It may be determined if the gesture action is predicted 630 by a projector. If the gesture action is predicted, action attributes may be copied 635 to the projector receiving the gesture. If the action of the gesture is not predicted, then the gesture action attributes may be assigned 625 to the projector, in whose display area the gesture has entered. The gesture action may then be queued 650 and it may be determined whether the gesture action is adjacent to a display area of other projectors 645. If so, anticipation messages may be sent 640 to those adjacent projectors.

In an exemplary embodiment, each of a plurality of gestures may belong to a different user. The gestures may be detected simultaneously by the projector-camera enabled devices. If the gesture is within a predetermined proximity of another gesture, the gesture may be determined to be the same as the other gesture, and may be assigned the gesture identifier and gesture type of the other gesture. The gestures may be performed by a variety of input interfaces such as, for example, a human hand or a laser.

Figure 7:
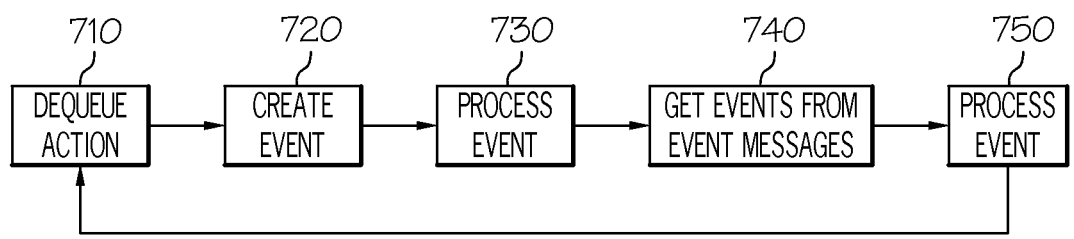
FIG. 7 shows distributed/cooperative/collaborative reaction management according to an exemplary embodiment of the invention.

In an exemplary embodiment, FIG. 7 shows a distributed/cooperative/collaborative reaction management protocol according to an exemplary embodiment of the invention. A gesture action may be removed from a queue 710 by a reaction manager, and an event may be created 720 for a projector. The created event may include a gesture identifier, a timestamp, a projector identifier, an event type, application parameters, a pointer to data, and a list of affected projectors. The gesture and its list of descriptors, such as, for example, an identifier, timestamp, and identifier may be independent of a type of reaction management application. For example, the reaction management application may be a cell phone application or an application for mapping the earth. The event type, application parameters, pointer to data, and the list of affected parameters may be specific to an application. For example, a cell phone application may have different application parameters than a mapping application. The event may be processed 730 and the projectors may communicate with other projectors that respond to the event The distributed/cooperative/collaborative gesture management protocol may then check 740 if it has received events from other projectors. If so, the events may be processed 750. by computing event attributes and associating the event with the gesture, determining if the created event and events from other projectors refer to the same gesture, send event messages to those of the projectors affected by a processed created event and processed received events, and execute the created event and received events by performing a function associated with the created event and the received event.

Figure 8:
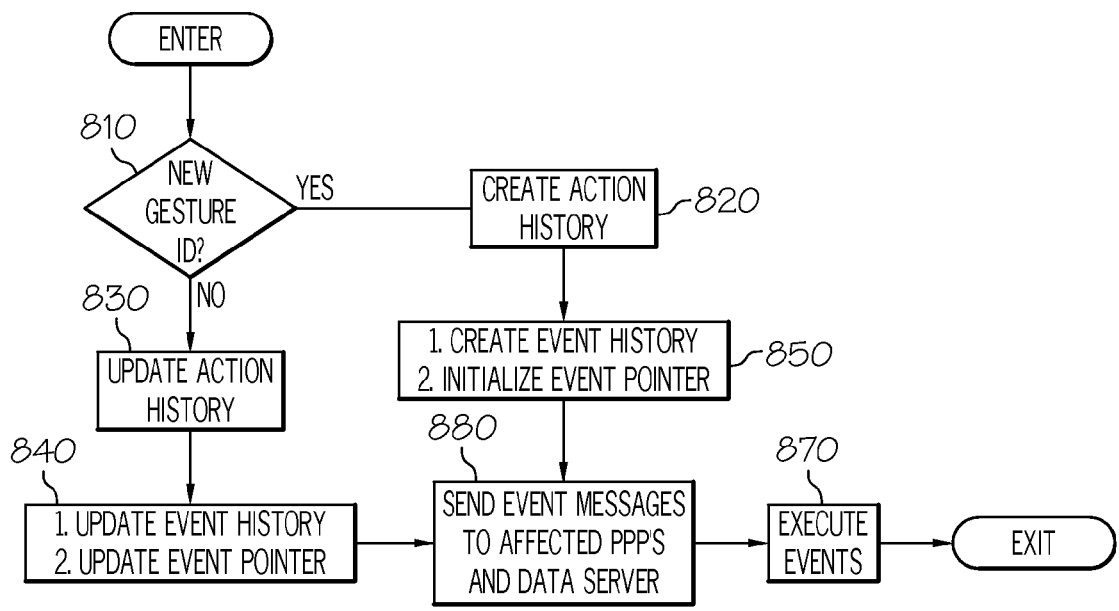
FIG. 8 shows distributed/cooperative/collaborative reaction management showing the processing of events according to an exemplary embodiment of the invention.

Referring to FIG. 8, it may be determined if the gesture identifier in a received event is new 810. If so, an action history may be created 820 for the event and the gesture identifier may be stored in a database. An event history may also be created 850, and an event pointer may be initialized. 850. If the gesture identifier is not new, an action history 830 may be updated. In addition, the event history and event pointer may be updated 840. Following the creation or updating of an event, the event attributes may be computed, and event messages may be sent 860 to affected projectors (those projectors with a display area adjacent to the gesture) and a data server. The events may then be executed 870 by performing a function associated with the created events or events received for updating.

Figure 9:
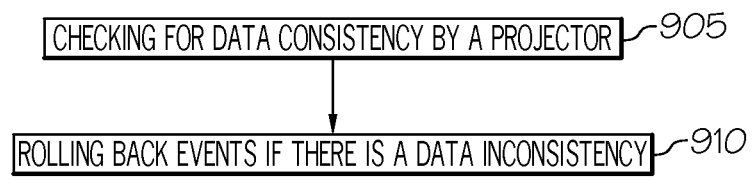
FIG. 9 shows a flowchart of checking for data inconsistency.

Referring to FIG. 9, in an exemplary embodiment, if an event from a prior action is waiting in a queue while a current action is being executed, a step 905 may include a check for data consistency by the projectors such as, for example, the data is ordered correctly by the events being processed in the same order in each of the projectors. If it is determined that there is a data inconsistency, a step 910 may include rolling back events in the event history for events that have a larger timestamp than the created event. Rolling back events may include reversing the event pointer for each of the rolled back events, inserting the received event in the event history at the position of the reversed event pointer, executing the created event, and re-executing subsequent events.

Figure 10:
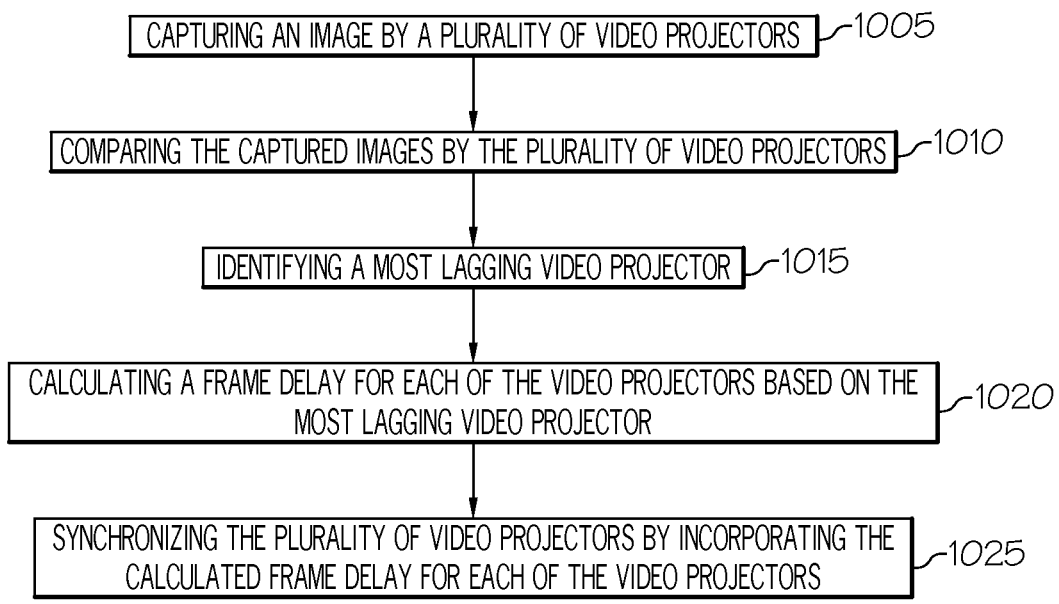
FIG. 10 shows a flowchart of synchronization of projectors according to an exemplary embodiment of the invention.

Referring to FIG. 10, video fame synchronization 1000 may include a step 1005 of capturing an image by a plurality of projectors. In an exemplary embodiment of the invention, video frame synchronization for a federation of projectors may include tiling or overlaying output of pico-projectors together, creating a high resolution video. For example, images from multiple projectors may be tiled, or overlaid on top of each other. Each of the pico-projectors may be equipped with a camera covering an entire projected display. Displaying frames may occur at times internal to each projector. The display time of frames may be matched across multiple projectors. The next frames may be displayed based on a calculation based on a frame rate in each individual projector. The frame rate in each individual projector may be set based on an internal clock. A step 1010 may include comparing the captured images by the plurality of projectors. A step 1015 may include identifying a most lagging projector. As an example, a projector that is displaying the image at a time most behind the other projectors may be identified as the most lagging projector. A step 1020 may include calculating a frame delay for each of the projectors based on the most lagging projector. As an example, the difference in time between each projector and the most lagging projector may be calculated. A step 1025 may include synchronizing the plurality of projectors by incorporating the calculated frame delay for each of the projectors. For example, each of the projectors may be delayed based upon the difference in time in displaying the image between a respective projector and the most lagging projector.

In an exemplary embodiment of the invention, a most lagging projector may contain a smallest frame number. Frame delay may be calculated from a difference in frame number from the most lagging projector and a from number of each of the other projectors. A frame display time of each of the projectors may be calculated using a clock rate found on the respective projector. The clock rate may be different for each of the projectors.

In an exemplary embodiment of the invention, video frame synchronization may include each of a plurality of projectors projecting a sequence of frames at a target frame rate. A master projector may use its camera to capture an image that may contain the frames captured by the plurality of projectors. The captured images may be compared by the plurality of projectors by passing frame information with Quick Response (QR) codes. In an exemplary embodiment of the invention, QR codes may be utilized for embedding frame information. The QR codes may be used to register the projectors with each other. By embedding frame lag information with the QR codes, registration of the projectors with each other may occur simultaneously with sending time lag information to each other. A projector with maximum frame lag may be specified as the most lagging projector. A frame lag may be computed for each of the plurality of projectors. Each of the frames may include a frame number and a projector identifier encoded as a pattern. The projector with a maximum frame lag may be a projector with a minimum frame number. A frame delay for each of the projectors may be based upon the time difference in displaying an image by the respective projector and the most lagging projector. The video synchronization may be repeated for accuracy at a sub-frame level. For example, after a first round of synchronization, the synchronization may be accurate to the frame level. Subsequent rounds of synchronization may add additional synchronization accuracy. The plurality of projectors may be synchronized by incorporating the calculated frame delay for each of the projectors. The frame lag amount for each of the projectors may be forwarded to the respective projector. Each of the projectors may stall its current frame for the number of frames of its frame lag. Maximum frame difference between any two projectors may be, for example, less than 33 milliseconds.

In an exemplary embodiment of the invention, synchronization of the projectors may occur in a distributed/cooperative/collaborative manner. The projectors may be positioned in a tiled, or overlaying setup and each of the projectors may position a camera that may capture an image containing the camera's own projection area and also portions of other projectors' camera projection areas. A reference projector may be specified among adjacent projectors. In contrast to the above embodiment that uses a projector with maximum frame lag as a reference by the other projectors, this embodiment may use adjacent projectors as references. For example, a projector's camera may be positioned to view areas of projectors above, to the left, and above left, of the camera's current projection area. A reference projector among adjacent projectors may be specified. Frame information of the reference projector may be passed to adjacent projectors. The captured image from the plurality of projectors may be compared with the image received from the reference projector. Frames may be advanced or delayed to synchronize the plurality of projectors with the reference projector. The adjacent projectors may also synchronize with the reference projector by advancing or delaying frame display time. A flag may specify whether a projector has joined a set of projectors. Distributed/cooperative/collaborative synchronization may be performed in stages between multiple groups of the projectors until all of the projectors in all adjacent groups are synchronized with each other.

It should be understood, of course, that the foregoing relates to exemplary embodiments of the invention and that modifications may be made without departing from the spirit and scope of the invention as set forth in the following claims.

What is claimed is:

1. A method of distributed/cooperative/collaborative gesture management, comprising:
    detecting, by a camera, movement of a gesture as the gesture moves across a display;
    processing the movement of the gesture as the gesture moves within areas of the display corresponding to a subset of a plurality of projectors in which the subset of the plurality of projectors has a defined priority to claim management of the gesture via proximity of the gesture to respective areas of the display, and each of the plurality of projectors operates independently of the others of the plurality of projectors; and
    processing an event associated with the processed movement of the gesture.

2. The method of claim 1, wherein each of a plurality of gestures move across the display and movement from each of the plurality of gestures are processed by the subset of plurality of projectors.

3. The method of claim 2, wherein the subset of the plurality of projectors sees part of the gesture within an overlap of respective areas of the display and sends messages amongst the subset of projectors to identify the gesture as a single gesture.

4. The method of claim 2, wherein each of the plurality of gestures is assigned an identifier, and a list of descriptors.

5. The method of claim 2, wherein each of the plurality of gestures is performed by one of a plurality of input interfaces.

* * * * *